Patented May 22, 1934

1,959,557

UNITED STATES PATENT OFFICE 1,959,557

MANUFACTURE OF COLORED ARTICLES FROM DISPERSIONS OF RUBBER OR THE LIKE

Douglas Frank Twiss, Wylde Green, Edward Arthur Murphy, Erdington, Birmingham, and Robert Gilbert James, Selly Park, Birmingham, England, assignors to Dunlop Rubber Company Limited, Erdington, Birmingham, England, a British corporation No Drawing. Application September 11, 1930, Serial No. 481,360. In Great Britain October 11, 1929

6 Claims. (Cl. 18—50)

This invention relates to a method for coloring articles obtained by any one or more of the operations such as dipping, spreading, painting, extruding, spraying, electrophoresis, impregnating, or moulding, from aqueous dispersions containing organic materials and particularly rubber.

Heretofore in coloring such articles the pigment or insoluble color has been added to the dispersed material or dispersed into the dispersion and thus incorporated in and throughout the body of the resultant article. Coloring of the rubber in this manner, however, involves difficulties and limits the control and flexibility of the results obtained.

The object of the invention is to impart substantially fixed colorations by chemical interactions locally or generally over the surface of articles obtained from aqueous dispersions aforesaid subsequent to the actual formation of the article, thereby enabling the coloration operation to be controlled and effected with ease and to provide rubber articles in which the color is formed in the rubber at its surface.

According to the invention the colorings are produced by chemical interaction which are effected substantially upon the surfaces of the formed articles by incorporating one or more of the reacting substances with the colorless or uniformly colored aqueous dispersions of the kinds hereinafter specified prior to the formation of the articles to an agent as for example, heat or a chemical reagent which leads to the formation of the coloring desired.

Alternatively the formed articles obtained from the colorless or uniformly colored aqueous dispersions prior to any substantial drying taking place are partly or completely brought into contact with one or more chemical reagents which upon further treatment, as for example, the application of heat or interaction with another chemical reagent produce the desired colorings.

The invention has been found to be particularly applicable to natural or artificial aqueous dispersions of rubber or similar vegetable resins such as gutta percha or balata with or without the addition of aqueous dispersions or emulsions of rubber-like substances such as the so-called synthetic rubbers or mineral rubbers or rubber substitutes such as factice or rubber reclaim or rubber waste or oils, for example, rape oil or vulcanized oils or cellulose esters, viscose or proteins, for example, casein.

The dispersions may be concentrated and/or compounded or vice versa. The compounding ingredients may be chosen from vulcanizing agents such as sulphur, fillers and reinforcing agents such as whiting, clay, barium sulphate, lithopone, lamp black, gas black, zinc oxide or even ebonite or vulcanite, accelerators of vulcanization, coloring matters and preservatives or softeners.

Compounded concentrates such as are described in co-pending Patent No. 1,846,164, are particularly suitable for use.

Aqueous dispersions or emulsions of synthetic rubbers with or without any one or more of the hereinbefore mentioned compounding ingredients may also be employed:—

Examples of carrying the invention into effect are as follows:—

Example 1

A wet freshly coagulated latex deposit on a shaped former produced, for example, according to the process described and claimed in Patent 1,887,190, November 8, 1932, is immersed partly or completely in a solution of indigo white produced by reducing indigo with an alkaline reducing agent, for example, sodium hydrosulphite. The deposit treated in this manner may, if desired, be momentarily dipped in water for the removal of any surplus dyeing solution and is then exposed to the atmosphere, when upon the treated surface there is produced by oxidation the blue color desired. The article is then dried and may be vulcanized in any known manner.

Other leuco dyestuffs can also be employed in a similar manner to that of indigo white.

Example 2

A wet shaped deposit is produced as in Example 1 from latex containing a substance such as beta-naphthol which is capable of reacting with a diazo solution to yield a colored azo dyestuff, preferably but not necessarily one insoluble in water. The wet deposit containing the beta-naphthol can be immersed in a solution of diazotized aniline, p-nitraniline or primuline. A red Azo-pigment is thus produced on the surface of the deposit and on drying a colored article is obtained. If desired, the application of the diazo solution can be local with consequent only local development of color.

Example 3

To produce a lake upon an article a wet shaped deposit can be coagulated or set by a saline solution, for example, an aluminium salt, a magnesium salt, a ferric salt or a tin salt. The wet set deposit is then immersed in a solution of alizarin, for example, in very dilute ammonia, when the retained metal of the coagulant salt forms a lake with the alizarin, thereby producing a stable color in the article.

By effecting a partial setting of a wet deposit with a coagulant incapable of forming a lake with the alizarin, as for example, with acetic acid or with a dehydrating and setting solution such as concentrated ammonium acetate, and then partially immersing the deposit in a solution of alum or other suitable salt a subsequent immersion in the alizarin solution yields a partially colored article.

As a further alternative the article after partial coagulation or setting with a coagulant incapable of forming a lake, may be treated locally with several lake-forming salts when immersion in a single bath of alizarin yields a multi-colored article.

*Example 4*

A wet shaped deposit coagulated or set with the aid of an acid coagulant or an acidified dehydrating and setting bath, as described and claimed in co-pending Patent 1,887,190, November 8, 1932, is dipped into a solution of a sulphur dye in an alkaline-sulphide solution. The dye is precipitated into the acidic surface of the deposit.

Having now particularly described and ascertained the nature of our said invention and in what manner the same is to be performed, we declare that

What we claim is:—

1. A process of coloring rubber articles which comprises forming an article from an aqueous dispersion of rubber material and thereafter exposing said article to a water-soluble, color agent not absorbed from aqueous solution by dry rubber before the water of said dispersion is entirely removed from the article.

2. A process of coloring rubber articles which comprises forming an article from an aqueous dispersion of rubber material and incorporating therein a color reagent and thereafter exposing said article to a water-soluble, color forming reagent not absorbed from aqueous solution by dry rubber before the water of said dispersion is entirely removed from the article.

3. A process of forming colored rubber articles which comprises forming an article from an aqueous dispersion of rubber material, thereafter immersing said article in an aqueous solution of indigo white before the water of said dispersion is entirely removed from the article.

4. A process of forming colored rubber articles which comprises forming an article from an aqueous dispersion of rubber material, thereafter immersing said article in an aqueous solution of indigo white and exposing it to oxidation before the water of said dispersion is entirely removed from the article.

5. The process of claim 1 in which the article is formed with a lake forming metallic compound and in which said color reagent is one forming a lake with said compound.

6. The process of claim 1 in which the article contains acid materials and the reagent is soluble in alkaline solutions and is precipitated in acid solutions.

DOUGLAS FRANK TWISS.
EDWARD ARTHUR MURPHY.
ROBERT GILBERT JAMES.